(No Model.)

W. HARTY.
ROLLING MILL.

No. 276,177. Patented Apr. 24, 1883.

WITNESSES:
John J. Rafferty
Geo. S. Dexter

INVENTOR.
William Harty
by Austin F. Park,
Attorney

UNITED STATES PATENT OFFICE.

WILLIAM HARTY, OF JOHNSTOWN, PENNSYLVANIA.

ROLLING-MILL.

SPECIFICATION forming part of Letters Patent No. 276,177, dated April 24, 1883.

Application filed October 14, 1881. (No model.)

*To all whom it may concern:*

Be it known that I, WILLIAM HARTY, a citizen of the United States, residing at Johnstown, in the county of Cambria and State of Pennsylvania, have invented certain Improvements in Rolling-Mills, of which the following is a specification, reference being had to the accompanying drawings.

My invention relates to improvements in rolling-mills in which the journal-bearings for the lower roll are adjustable by wedges; and the principal objects of my improvements are to provide improved means for operating the wedges.

Figure 1:
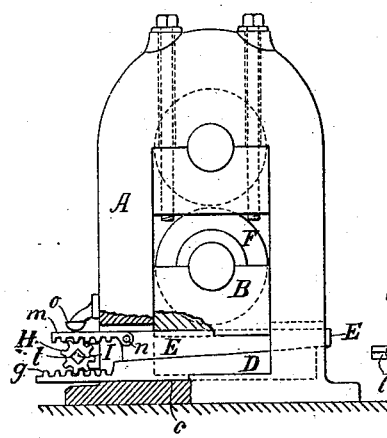
Figures 2, 7:
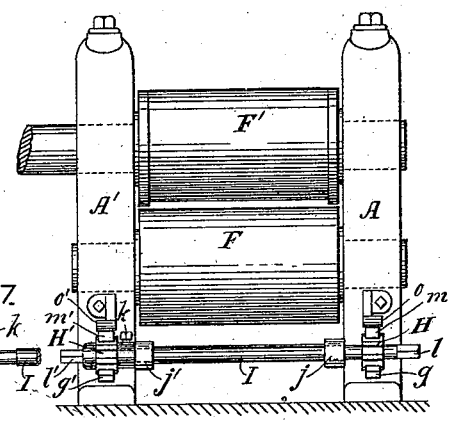
Figure 4:
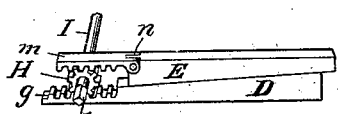
Figure 5:
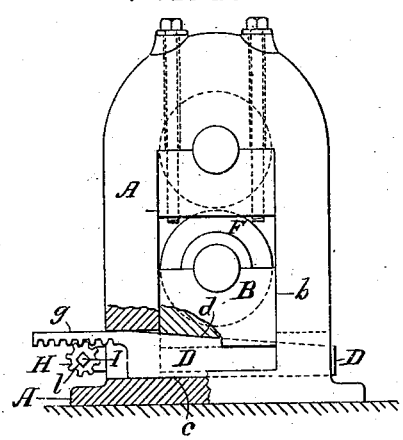
Figure 3:
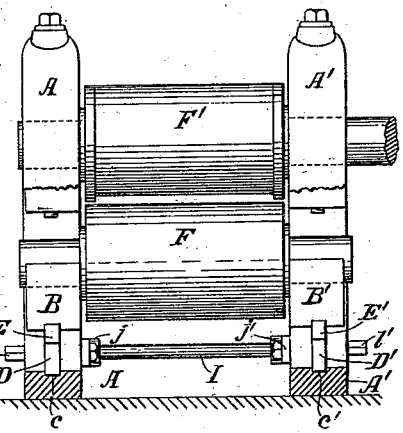
Figure 6:
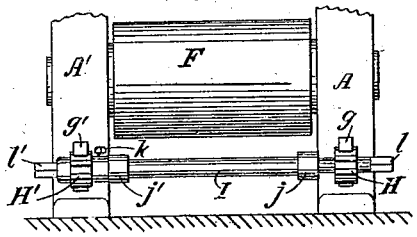

In the aforesaid drawings, Figure 1 is an end elevation partly in section, Fig. 2 a front elevation, and Fig. 3 a rear elevation partly in section, all of a rolling-mill which embodies one form of all my improvements. Fig. 4 is a perspective view of a detached part of the same rolling-mill. Fig. 5 is an end elevation partly in section, and Fig. 6 is a front elevation, of a portion of a rolling-mill that embraces a part of my invention. Fig. 7 is a section of a part of the wedge-operating devices.

A A' are the housings.

B B' are the lower journal-bearings, movable vertically in the housings. The housings are formed with the stationary bearings C C', extending horizontally through the housings and across the spaces under said journal-bearings.

D D' are equal wedges, which fit in and upon the bearings C C', and support the movable bearings B B', either directly, as in Figs. 5 and 6, or by intervening vertically-movable blocks or wedges E E', as in Figs. 1, 2, 3, so that the whole lengths of those parts of the wedges which are under the journal-bearings B B' are directly and firmly supported by the stationary bearings C C' in the housings.

In order to easily slide and securely adjust the wedges D D' between the bearings B B' and C C' by means generally less expensive than the screws or gearing heretofore used for the purpose, and generally less liable than the latter to get clogged by the scales of oxide from heated iron or steel passing between the rolls F F', and at the same time have the entire lengths of those parts of the wedges D D' that are under the bearings B B' directly and firmly supported by the fixed bearings C C', as above described, I form or furnish the wedges D D' with toothed racks *g g'*, extending outside of the housings, and parallel to the lower sides of the wedges that are against the bearings C C', and combine therewith two pinions, H H', engaging with the racks *g g'* outside of the housings.

For simultaneously operating the two wedges D D', and thereby raising or lowering and adjusting both of the journal-bearings B B' at the same instant, I mount and firmly fasten the two pinions H H' on and to a shaft, I, that is mounted parallel to the rollers F F', and capable of being rotated in fixed bearings *j j'* on the housings.

For conveniently adjusting the pinions and wedges to the journal-bearings, and for moving the wedges separately and thereby raising and lowering the bearings B B' independently and to different heights whenever desired, I mount the two pinions in any suitable manner whereby they can be conveniently turned separately as well as simultaneously and equally. Thus the pinion H can be fast on the shaft I, while the pinion H' in Figs. 2, 6, and 7 has a socket fitting on the shaft I, and fastened thereto by a set-screw, *k*, as shown in Fig. 7, so that upon loosening the set-screw the pinion H' can be freely turned on and around the shaft I, while the latter and the pinion H remain stationary, and so that the shaft with the pinion H can be turned without turning the pinion H'. The end parts, *l* and *l'*, of the shaft I and pinion H' are shown of angular shape for convenience in turning the same by a corresponding crank or lever; but the shaft and pinion can be turned together or separately by any suitable means.

With only the two movable wedges D D' under the journal-bearings B B', as in Figs. 5 and 6, these wedges, when desirably short, require to be rather steeply inclined to impart sufficient movements to the journal-bearings, and the lower sides of the latter are inclined to fit along the inclined upper surfaces of the wedges, as indicated in Fig. 5 at *d*, and consequently the forcing upward of the journal-bearings by those wedges causes much lateral pressure and friction by the journal-bearings against the contiguous sides *b*, Fig. 5, of the housings. To avoid such defects and to further improve the adjusting devices, I make the wedges D D' less steeply inclined, and interpose between those wedges and the journal-bearings B B' other equal wedges, E E', Figs. 1, 2, 3, 4, having their lower surfaces inclined reversely to and in contact with the upper surfaces of the wedges D D', and have the upper surfaces of the wedges E E' and the contiguous under surfaces of the bearings B B' essentially parallel to the lower surfaces of the wedges D D' and the fixed bearings C C', and also furnish the wedges E E' with toothed racks m m', secured to those wedges by hinge-joints n, Figs. 1 and 4, and kept in engagement with the pinions H H' as the wedges rise and fall by properly arranged narrow stationary bearings o o', Figs. 1 and 2, on the housings, so that by turning the pinions H H' the two wedges D E and D' E' of each set will be simultaneously moved in opposite directions, and will thereby raise or lower the bearings B B', and adjust the same with ease and stability.

It is obvious that the endwise to and fro movements simultaneously imparted in opposite directions to the wedges D D' and E E' by the shaft I, pinions H H', and racks g g' and m m' will cause the wedges E E' to rise and fall in their endwise movements, and thereby bring into action the joints n and fixed bearings o o', by which the racks m m' are preferably kept in proper mesh with the pinions, and that by having the racks m m' integral with the wedges E E', those racks must be much inclined to keep engaged with the pinions as the wedges E E' rise and fall in their endwise movements to and fro.

The mechanism shown by Figs. 5 and 6 is substantially embraced in that illustrated by Figs. 1, 2, and 3, in which latter mechanism the wedges E E' are introduced between the wedges D D' and journal-bearings B B'.

In Figs. 5 and 6 the racks g g' are shown over the pinions H H', as is best to prevent scales of oxide from lodging in the racks and pinions when only the one pair of wedges D D' is used; and in Figs. 1, 2, and 3 the racks g g' on the wedges D D' are shown under the pinions H H', as is best when the two pairs of wedges D D' and E E' are employed.

Prior to my invention a rolling-mill was devised with its lower journal-bearings movable vertically in the housings by means of wedge-bars arranged under and supporting said journal-bearings, and supported by fixed horizontal ways in the housings, and movable to and fro endwise on said ways by means of toothed racks on said wedge-bars and along their lower bearing-surfaces, and engaging with pinions fast on a rotary shaft and arranged within the housings and directly under said wedge-bars and journal-bearings. In such prior rolling-mill the housings were greatly weakened by the large spaces required therein to admit and accommodate the pinions directly under the journal-bearings and wedge-bars, and the racks along the under sides of the wedge-bars prevented the latter from being supported across their whole width by the fixed ways, and said ways did not extend lengthwise, nor support the wedge-bars continuously across the spaces under the journal-bearings. In my improved rolling-mill I avoid those defects, and produce at a cheaper rate a generally better device for supporting and adjusting the lower journal-bearings by having the racks g g' of the wedges D D' wholly beyond the ends of those wedges, and the pinions H H' on the shaft I, and engaged with the racks g g' outside of the housings, and the fixed ways for the wedges D D', extended lengthwise under the journal-bearings, substantially as above described, and illustrated in the drawings.

What I claim as my invention is—

1. The combination, with the housings A A', having therein the vertically-movable journal-bearings B B', and the fixed ways C C', extending under the journal-bearings, of the wedges D D', mounted on said fixed ways, and having at their ends the projecting racks g g' integral with said wedges and parallel with said fixed ways, shaft I, mounted to turn in fixed bearings on the housings, and the pinions H H' on said shaft and engaging with said racks outside of the housings, substantially as described.

2. The combination, with the housings A A', having therein the vertically-movable journal-bearings B B' and the fixed ways C C', of the wedges D D', mounted on said ways, racks g g' on and extending from the ends of said wedges, shaft I, mounted on the housings, pinions H H' on said shaft and engaging with said racks outside of the housings, and means for adjusting one of said pinions circumferentially upon said shaft, substantially as described.

3. The combination, with the housings having therein the vertically-movable journal-bearings and the fixed ways C C', of the wedges D D', mounted on said ways, and having on their ends the projecting racks g g', parallel to said fixed ways, wedges E E', mounted on the wedges D D', and having on their ends projecting racks m m', shaft I, mounted to turn in fixed bearings on the housings, and pinions H H' fast on said shaft and engaging with the racks g g' and m m' outside of the housings, substantially as described.

4. The combination, with the housings having therein the vertically-movable journal-bearings B B' and the fixed ways C C', of the wedges D D', mounted on said fixed ways, and having on and integral with their ends the projecting racks g g' parallel to said ways, shaft I, mounted on the housings, pinions H H' on said shaft and engaging with said racks, wedges E E' upon the wedges D D' and under said journal-bearings, projecting racks m m', jointed to the ends of the wedges E E', and the fixed narrow bearings o o', for keeping the latter racks in mesh with said pinions, substantially as set forth.

In testimony whereof I hereunto set my hand, in the presence of two subscribing witnesses, this 30th day of September, 1881.

WM. HARTY.

Witnesses:
AUSTIN F. PARK,
JAMES T. GOODFELLOW.